No. 652,794. Patented July 3, 1900.
E. L. LOWE.
COUPLING BOLT.
(Application filed Oct. 10, 1898.)
(No Model.)
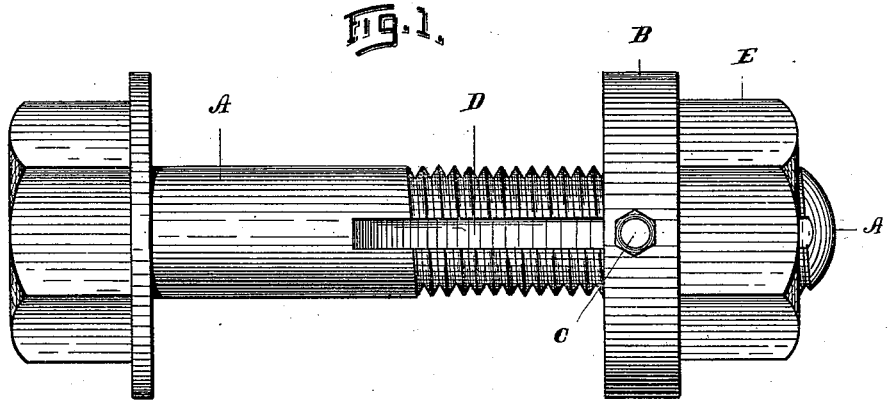
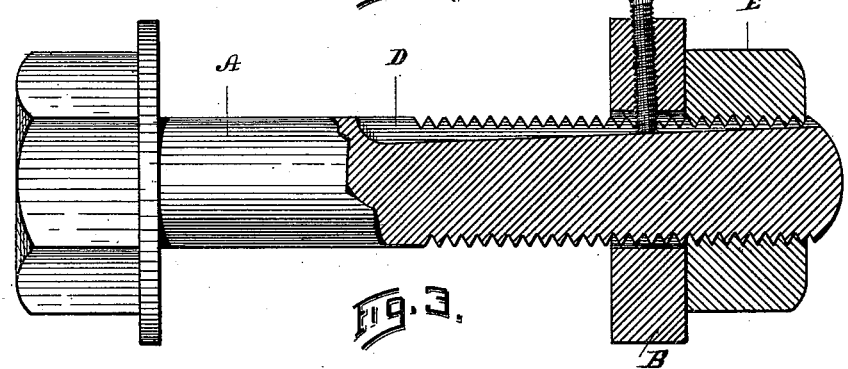
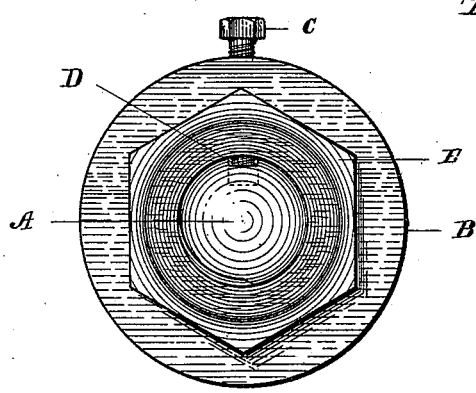
Witnesses
Baldwin Vale.
Jno. S. Robbins.
Inventor
Enoch Louis Lowe

UNITED STATES PATENT OFFICE.

ENOCH LOUIS LOWE, OF SAN FRANCISCO, CALIFORNIA, ASSIGNOR TO SUSANNA LOWE, OF SAME PLACE.

COUPLING-BOLT.

SPECIFICATION forming part of Letters Patent No. 652,794, dated July 3, 1900.

Application filed October 10, 1898. Serial No. 693,196. (No model.)

*To all whom it may concern:*

Be it known that I, ENOCH LOUIS LOWE, a citizen of the United States, residing at San Francisco, State of California, have invented a new and useful Improvement in Coupling-Bolts and other Coupling Devices Using Nuts Thereon, of which the following is a specification.

My invention relates to and its object is to secure a collar upon a coupling-bolt or other coupling device and to prevent its being moved by vibratory motion of the surrounding parts or material or by the contraction or expansion of the material or parts near or in contact with it and to offer an increasing resistance to the collar should it be moved by force in the direction of the end over which it first slips on the bolt when being put in position on the bolt or other coupling device.

My invention consists of a threaded coupling-bolt headed at one end and a longitudinal groove or channel formed in its surface, decreasing in depth from the bolt-head end toward the other end, and a set-screw adapted to pass transversely through the side of the threadless collar, which is adapted to slip over the end of the bolt, and said set-screw adapted to engage and interlock with the channel or groove on the bolt when the collar is in position. The parallel sides formed by groove or channel when engaging the point of the set-screw, which engages the surface of groove or channel at the same time, will prevent any lateral or rotary movement of the bolt or collar relative to each other, and the set-screw binding on the surface of the groove or channel will prevent any longitudinal movement of the collar along the bolt or channel thereon. The groove or channel decreasing in depth toward the outer or nut end of the bolt will offer increasing resistance to the point of the set-screw engaging the groove or channel should the collar containing same be forced from the position as first set. The threaded nut engaging the threads upon the bolt can be used to force the collar into binding or coupling position desired, and I use the threaded nut in combination with the bolt, threadless collar, channel or groove, and set-screw.

Figures 1, 2, and 3 show how I attain the hereinbefore-described objects and their parts illustrated in the accompanying drawings. Fig. 1 is an elevated side view of a headed and threaded coupling-bolt, the bolt being designated as A, with a threadless collar B in position thereon, a set-screw C passing transversely through the collar B, adapted to engage the channel or groove D on the bolt A, and a threaded nut E in position on the bolt A. Fig. 2 is a part section of Fig. 1, showing the set-screw C passing transversely through a part of the threadless collar B and interlocking with the longitudinal channel or groove D, formed on the bolt A, and a threaded nut E in position on the bolt A. Fig. 3 is an end elevation of tie device.

Similar letters refer to similar parts throughout the three figures in the accompanying drawings.

Let A in Fig. 1 represent the headed and threaded bolt upon which the threadless collar B slides, and C the set-screw placed transversely through the collar B, and D the inclined channel or groove formed longitudinally on the surface of the bolt A, and E the threaded nut used to force the threadless collar B into position on the bolt A.

I slip the threadless collar B over the end of the threaded bolt A and use the threaded nut E to force the collar B into the binding and coupling position desired on the bolt A. The set-screw in the collar B being first over the channel or groove D, I interlock the collar B and the set-screw C.

I do not confine myself in this application to a strict arrangement or construction of the parts of the invention as herein described.

Having described my invention, what I claim, and desire to obtain by Letters Patent, is—

1. In a coupling-bolt, a headed bolt provided with a screw-thread thereon, a longitudinal groove cut at right angles to the screw-threads in said bolt, a collar adapted to slide over said bolt, said collar provided with a set-screw, and a screw-threaded nut on said bolt contacting said collar for the purpose as shown and described.

2. In a coupling-bolt, a headed bolt provided with a screw-thread thereon, a tapering groove cut in said bolt and screw-thread, a collar adapted to slide over said bolt, and groove therein, said collar being provided with a set-screw, said set-screw passing through said collar and engaging said tapering groove and the means for forcing said collar toward the head of said bolt for the purpose as specified.

3. In a coupling-bolt, a headed bolt provided with a screw-thread thereon, a tapering groove cut in said bolt and through said screw-thread, a collar adapted to slide over said bolt and groove therein, said collar being provided with a set-screw which engages the bottom of said tapering groove, and the means for preventing said collar from turning on said bolt, in combination with a screw-threaded nut for engaging the screw-threaded bolt and forcing said collar toward the head of said bolt for the purpose as shown and described.

4. In a coupling-bolt, a headed bolt provided with a screw-thread thereon, a longitudinal tapering groove cut in said bolt which increases in depth from the nut end toward the head end of said bolt, a collar adapted to slide over said bolt, said collar being provided with a set-screw, said set-screw passing through said collar, and the end of said set-screw engaging the bottom of said tapering groove, the end of said set-screw also adapted to contact the walls of said tapering groove, and the means for forcing said collar toward the head of said bolt, for the purpose as specified.

In testimony whereof I have hereunto affixed my signature, in the presence of two witnesses, this 19th day of September, A. D. 1898.

ENOCH LOUIS LOWE.

Witnesses:
J. P. MAYBO,
D. BOTTELER.